(12) United States Patent
Chase et al.

(10) Patent No.: US 11,584,240 B2
(45) Date of Patent: Feb. 21, 2023

(54) INTELLIGENT VEHICLE CHARGING STATION

(71) Applicants: Arnold Chase, West Hartford, CT (US); William Chase, West Hartford, CT (US)

(72) Inventors: Arnold Chase, West Hartford, CT (US); William Chase, West Hartford, CT (US)

(*) Notice: Subject to any disclaimer, the term of this patent is extended or adjusted under 35 U.S.C. 154(b) by 71 days.

(21) Appl. No.: 15/957,057

(22) Filed: Apr. 19, 2018

(65) Prior Publication Data

US 2018/0304760 A1     Oct. 25, 2018

Related U.S. Application Data

(60) Provisional application No. 62/487,220, filed on Apr. 19, 2017.

(51) Int. Cl.
*B60L 53/126* (2019.01)
*G05D 1/00* (2006.01)
(Continued)

(52) U.S. Cl.
CPC ............ *B60L 53/126* (2019.02); *B60L 53/36* (2019.02); *B60L 53/65* (2019.02); *B60L 53/67* (2019.02);
(Continued)

(58) Field of Classification Search
CPC .................................................. B60L 53/126
(Continued)

(56) References Cited

U.S. PATENT DOCUMENTS 4,386,308 A * 5/1983 Emile, Jr. ......... H02J 7/007192
                                              320/DIG. 19
5,617,003 A    4/1997 Odachi et al.
(Continued)

FOREIGN PATENT DOCUMENTS

CN      104810906 A    7/2015
CN      106671811 A    5/2017
(Continued)

OTHER PUBLICATIONS

Karfopoulos et al., "A Multi-Agent System for Controlled Charging of a Large Population of Electric Vehicles", IEEE Transactions on Power Systems, vol. 28 (2), May 2013, p. 1196-1204, Sep. 11, 2012.
(Continued)

*Primary Examiner* — Jean Paul Cass
(74) *Attorney, Agent, or Firm* — McCormick, Paulding & Huber PLLC

(57) ABSTRACT

An intelligent vehicle charging system for charging a fleet of autonomous vehicles throughout a network of charging stations dispersed throughout a geographic area. The intelligent vehicle charging system includes a remote control system that is in operative communication with each of the autonomous vehicles in the fleet and each of the charging stations in the network. When an autonomous vehicle is in need of a power charge, or as directed by the remote control system, the remote control system will identify an available charging station, guide the autonomous vehicle to the charging station, verify that the autonomous vehicle has arrived at the charging station, initiate the power charging process, account and bill appropriate fees for the charging process, and log all associated activity. The remote control system is also capable of remotely and instantaneously terminating the power charging process to dynamically return a vehicle back to service.

44 Claims, 4 Drawing Sheets

(51) Int. Cl.
| | | |
|---|---|---|
| G05D 1/02 | (2020.01) | |
| G01C 21/34 | (2006.01) | |
| G06F 16/9537 | (2019.01) | |
| B60L 53/65 | (2019.01) | |
| G06F 16/29 | (2019.01) | |
| B60L 53/67 | (2019.01) | |
| B60L 53/36 | (2019.01) | |
| B60L 53/68 | (2019.01) | |
| G05B 19/042 | (2006.01) | |
| G06Q 20/14 | (2012.01) | |
| G06Q 30/04 | (2012.01) | |
| G06Q 50/06 | (2012.01) | |
| B60L 53/38 | (2019.01) | |

(52) U.S. Cl.
CPC .......... *B60L 53/68* (2019.02); *G01C 21/3469* (2013.01); *G05B 19/042* (2013.01); *G05D 1/0027* (2013.01); *G05D 1/0088* (2013.01); *G05D 1/028* (2013.01); *G05D 1/0217* (2013.01); *G05D 1/0225* (2013.01); *G05D 1/0291* (2013.01); *G05D 1/0297* (2013.01); *G06F 16/29* (2019.01); *G06F 16/9537* (2019.01); *G06Q 20/14* (2013.01); *G06Q 30/04* (2013.01); *G06Q 50/06* (2013.01); *B60L 53/38* (2019.02); *B60L 2240/622* (2013.01); *B60L 2240/72* (2013.01); *B60L 2260/32* (2013.01); *G05B 2219/2637* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | |
|---|---|---|---|
| 5,821,731 A | 10/1998 | Kuki et al. | |
| 7,986,126 B1 | 7/2011 | Bucci et al. | |
| 8,417,402 B2* | 4/2013 | Basir | G06Q 30/02 180/65.21 |
| 8,441,154 B2* | 5/2013 | Karalis | H02J 7/00309 307/104 |
| 8,466,583 B2* | 6/2013 | Karalis | H02J 7/0047 307/104 |
| 8,729,859 B2 | 5/2014 | Cook et al. | |
| 8,901,778 B2* | 12/2014 | Kesler | H02J 50/50 320/108 |
| 8,901,779 B2* | 12/2014 | Kesler | H02J 7/00309 307/104 |
| 8,907,531 B2* | 12/2014 | Hall | H02J 50/90 323/911 |
| 8,922,066 B2* | 12/2014 | Kesler | H03H 7/40 307/104 |
| 8,928,276 B2* | 1/2015 | Kesler | H01F 38/14 320/108 |
| 8,933,594 B2* | 1/2015 | Kurs | H02J 50/60 320/108 |
| 8,946,938 B2* | 2/2015 | Kesler | H02J 50/80 307/104 |
| 9,287,720 B2 | 3/2016 | Kawamura | |
| 9,302,594 B2* | 4/2016 | Tripathi | B60L 53/65 |
| 9,333,870 B2 | 5/2016 | Kume et al. | |
| 9,381,878 B2 | 7/2016 | Ichikawa | |
| 9,387,928 B1 | 7/2016 | Gentry et al. | |
| 9,409,491 B2 | 8/2016 | Ichikawa et al. | |
| 9,412,280 B1 | 8/2016 | Zwillinger et al. | |
| 9,505,314 B2 | 11/2016 | Widmer | |
| 9,577,440 B2 | 2/2017 | Partovi et al. | |
| 9,577,466 B2 | 2/2017 | Ku et al. | |
| 9,581,997 B1 | 2/2017 | Penilla et al. | |
| 9,606,539 B1 | 3/2017 | Kentley et al. | |
| 9,637,014 B2 | 5/2017 | Schneider et al. | |
| 9,643,505 B2 | 5/2017 | Ichikawa et al. | |
| 9,649,948 B2 | 5/2017 | Bell et al. | |
| 9,694,685 B2 | 7/2017 | Ricci | |
| 9,725,004 B2 | 8/2017 | Asai et al. | |
| 9,758,048 B2 | 9/2017 | Ueda | |
| 9,772,401 B2 | 9/2017 | Widmer et al. | |
| 9,780,574 B2 | 10/2017 | Niizuma | |
| 9,867,017 B1* | 1/2018 | Bacarella | H04W 4/029 |
| 9,873,346 B2 | 1/2018 | Maekawa | |
| 9,902,278 B2 | 2/2018 | Maekawa | |
| 9,908,425 B2 | 3/2018 | Prokhorov | |
| 9,925,883 B2 | 3/2018 | Bell et al. | |
| 9,969,287 B2 | 5/2018 | Roberts et al. | |
| 10,042,359 B1* | 8/2018 | Konrardy | G06F 30/20 |
| 10,044,235 B2 | 8/2018 | Takatsu et al. | |
| 10,065,517 B1* | 9/2018 | Konrardy | B60W 30/16 |
| 10,071,644 B2 | 9/2018 | Wechsler et al. | |
| 10,086,715 B2 | 10/2018 | Lewis et al. | |
| 10,236,727 B2 | 3/2019 | Takatsu et al. | |
| 10,279,697 B2* | 5/2019 | Uyeki | G06Q 10/06314 |
| 10,300,805 B2 | 5/2019 | Halker et al. | |
| 10,343,532 B2 | 7/2019 | Yuasa | |
| 10,427,549 B2 | 10/2019 | Yang et al. | |
| 10,457,158 B2 | 10/2019 | Namou et al. | |
| 10,464,432 B2 | 11/2019 | Katanoda | |
| 10,562,396 B2 | 2/2020 | Tokura | |
| 10,668,829 B2 | 6/2020 | Von Novak, III et al. | |
| 10,688,875 B2 | 6/2020 | Iwai et al. | |
| 10,766,373 B2 | 9/2020 | Nishio et al. | |
| 10,850,634 B2 | 12/2020 | Wang et al. | |
| 11,005,310 B2 | 5/2021 | Konschak et al. | |
| 2005/0108089 A1 | 5/2005 | Ehrman et al. | |
| 2008/0228613 A1* | 9/2008 | Alexander | G06Q 20/102 705/35 |
| 2009/0088924 A1 | 4/2009 | Coffee et al. | |
| 2009/0096413 A1 | 4/2009 | Partovi et al. | |
| 2010/0017249 A1 | 1/2010 | Fincham et al. | |
| 2010/0023195 A1 | 1/2010 | Traster | |
| 2010/0161481 A1 | 6/2010 | Littrell | |
| 2010/0241542 A1* | 9/2010 | Pinkusevich | B60L 53/14 709/204 |
| 2011/0144823 A1* | 6/2011 | Muller | B60L 53/65 700/297 |
| 2011/0202476 A1 | 8/2011 | Nagy et al. | |
| 2012/0098483 A1 | 4/2012 | Patel | |
| 2012/0106801 A1 | 5/2012 | Jackson | |
| 2012/0200259 A1 | 8/2012 | Sullivan et al. | |
| 2012/0280653 A1 | 11/2012 | Prosser et al. | |
| 2012/0319644 A1 | 12/2012 | Hu et al. | |
| 2012/0330494 A1 | 12/2012 | Hendrix et al. | |
| 2013/0214737 A1 | 8/2013 | Wu et al. | |
| 2013/0254097 A1* | 9/2013 | Marathe | G07F 15/005 705/35 |
| 2013/0317979 A1* | 11/2013 | Marathe | B60L 53/665 320/162 |
| 2014/0125144 A1 | 5/2014 | Nakamura et al. | |
| 2014/0132207 A1 | 5/2014 | Fisher | |
| 2014/0136414 A1 | 5/2014 | Abhyanker | |
| 2014/0222298 A1 | 8/2014 | Gurin | |
| 2014/0232336 A1 | 8/2014 | Kepka | |
| 2014/0252874 A1 | 9/2014 | Niizuma | |
| 2014/0257614 A1 | 9/2014 | Niizuma | |
| 2014/0257884 A1 | 9/2014 | Kyoung | |
| 2014/0258457 A1* | 9/2014 | Han | G07F 15/003 709/217 |
| 2014/0358353 A1 | 12/2014 | Ibanez-Guzman et al. | |
| 2014/0371969 A1 | 12/2014 | Asai et al. | |
| 2015/0015193 A1 | 1/2015 | Oman et al. | |
| 2015/0015419 A1 | 1/2015 | Halker et al. | |
| 2015/0035685 A1 | 2/2015 | Strickland et al. | |
| 2015/0046200 A1 | 2/2015 | Chihara | |
| 2015/0091511 A1 | 4/2015 | Ichikawa | |
| 2015/0145472 A1 | 5/2015 | Kees et al. | |
| 2015/0170814 A1 | 6/2015 | Blum et al. | |
| 2015/0202974 A1 | 7/2015 | Rüb et al. | |
| 2015/0206357 A1 | 7/2015 | Chen et al. | |
| 2015/0298565 A1 | 10/2015 | Iwamura et al. | |
| 2015/0306967 A1 | 10/2015 | Cohen | |

(56) References Cited

U.S. PATENT DOCUMENTS

| | | |
|---|---|---|
| 2015/0329005 A1 | 11/2015 | Oishi |
| 2015/0336270 A1 | 11/2015 | Storr |
| 2015/0348335 A1 | 12/2015 | Ramanujam |
| 2016/0001883 A1 | 1/2016 | Sanz et al. |
| 2016/0052406 A1 | 2/2016 | Ohashi et al. |
| 2016/0089987 A1 | 3/2016 | Ichikawa et al. |
| 2016/0125458 A1* | 5/2016 | Enriquez ............ G06Q 30/0267 705/14.27 |
| 2016/0139594 A1 | 5/2016 | Okumura et al. |
| 2016/0161266 A1 | 6/2016 | Crawford et al. |
| 2016/0176307 A1 | 6/2016 | Becker |
| 2016/0264011 A1 | 9/2016 | Yasukawa et al. |
| 2016/0273927 A1 | 9/2016 | Kitajima et al. |
| 2016/0301698 A1 | 10/2016 | Katara et al. |
| 2016/0303969 A1 | 10/2016 | Akula |
| 2016/0321566 A1 | 11/2016 | Liu et al. |
| 2016/0325631 A1 | 11/2016 | Lannoije et al. |
| 2016/0351056 A1 | 12/2016 | Herbach et al. |
| 2016/0370194 A1 | 12/2016 | Colijn et al. |
| 2017/0012474 A1 | 1/2017 | Takatsu et al. |
| 2017/0050749 A1 | 2/2017 | Pilskalns |
| 2017/0060129 A1 | 3/2017 | Ross et al. |
| 2017/0075358 A1 | 3/2017 | Zhang |
| 2017/0136894 A1 | 5/2017 | Ricci |
| 2017/0136902 A1 | 5/2017 | Ricci |
| 2017/0138539 A1* | 5/2017 | Aoki .......................... F17C 5/06 |
| 2017/0168493 A1 | 6/2017 | Miller et al. |
| 2017/0170690 A1 | 6/2017 | Shijo et al. |
| 2017/0225583 A1 | 8/2017 | Chai et al. |
| 2017/0259682 A1 | 9/2017 | Oettle et al. |
| 2017/0276503 A1 | 9/2017 | Oh et al. |
| 2017/0282739 A1* | 10/2017 | Cha ........................ G07C 5/06 |
| 2017/0305273 A1* | 10/2017 | Korenaga ............ H01M 10/441 |
| 2017/0315557 A1 | 11/2017 | Vogt et al. |
| 2017/0368944 A1* | 12/2017 | Huang .................. B60L 53/122 |
| 2018/0060776 A1 | 3/2018 | Ahmed et al. |
| 2018/0081360 A1 | 3/2018 | Bostick et al. |
| 2018/0105053 A1 | 4/2018 | Ahmed et al. |
| 2018/0118045 A1 | 5/2018 | Gruzen et al. |
| 2018/0143035 A1 | 5/2018 | Ricci |
| 2018/0272881 A1 | 9/2018 | Kojima |
| 2018/0272882 A1 | 9/2018 | Fontana et al. |
| 2018/0290551 A1 | 10/2018 | Jones et al. |
| 2018/0304761 A1 | 10/2018 | Chase et al. |
| 2019/0016312 A1 | 1/2019 | Carlson et al. |
| 2019/0122561 A1 | 4/2019 | Shimizu et al. |
| 2019/0126765 A1 | 5/2019 | Seo et al. |
| 2019/0126766 A1 | 5/2019 | Taguchi et al. |
| 2019/0205842 A1 | 7/2019 | Starns |
| 2019/0217735 A1 | 7/2019 | Donnelly et al. |
| 2020/0180447 A1 | 6/2020 | Nishimura et al. |
| 2020/0251929 A1 | 8/2020 | Partovi |
| 2020/0269714 A1 | 8/2020 | Leibetseder et al. |
| 2021/0061117 A1 | 3/2021 | Singuru et al. |
| 2021/0197677 A1 | 7/2021 | Terada |

FOREIGN PATENT DOCUMENTS

| | | |
|---|---|---|
| CN | 107199897 A | 9/2017 |
| CN | 107813726 A | 3/2018 |
| CN | 108177546 A | 6/2018 |
| CN | 108437825 A | 8/2018 |
| CN | 108437838 A | 8/2018 |
| CN | 108819788 A | 11/2018 |
| CN | 109004698 A | 12/2018 |
| CN | 109664778 A | 4/2019 |
| CN | 110027416 A | 7/2019 |
| CN | 110053499 A | 7/2019 |
| CN | 110126649 A | 8/2019 |
| CN | 110435450 A | 11/2019 |
| DE | 202012003577 | * 8/2012 |
| EP | 2547546 B1 | * 3/2010 |
| EP | 3315351 A2 | 5/2018 |
| JP | 2006113892 A | 4/2006 |
| JP | 2010230615 A | 10/2010 |
| JP | 2011114969 A | 6/2011 |
| JP | 2011203174 A | 10/2011 |
| JP | 2011252816 A | 12/2011 |
| JP | 2012003391 A | 1/2012 |
| JP | 2013046524 A | 3/2013 |
| JP | 2019082753 A | 5/2019 |
| KR | 102127167 B1 | 6/2020 |
| WO | 2010098412 A1 | 2/2010 |
| WO | 2010090333 A1 | 8/2010 |
| WO | 2012056530 A1 | 5/2012 |
| WO | 2013145581 A1 | 3/2013 |
| WO | 2012169197 A1 | 2/2015 |
| WO | 2015158589 A1 | 10/2015 |
| WO | 2017067470 A1 | 4/2017 |
| WO | 2018196385 A1 | 1/2018 |
| WO | 2018217640 A1 | 11/2018 |
| WO | 2019053676 A1 | 3/2019 |
| WO | 2019082076 A1 | 5/2019 |
| WO | 2019097900 A1 | 5/2019 |
| WO | 2020078982 A1 | 4/2020 |

OTHER PUBLICATIONS

Chen et al., "Operations of a shared, autonomous, electric vehicle fleet: Implications of vehicle & charging infrastructure decisions." In: Transportation Research Part A: Policy and Practice. Dec. 2016 (Dec. 2016) Retrieved from <https://pdfs.semanticscholar.org/65e1/f6dc55122accfcdc3cabcdba5f6da35b2492.pdf> entire document.

International Search Report for International Application No. PCT/US2018/028389 dated Jul. 13, 2018.

Written Opinion for International Application No. PCT/US2018/028389 dated Jul. 13, 2018.

International Search Report for International Application No. PCT/US2018/028396 dated Jul. 23, 2018.

Written Opinion for International Application No. PCT/US2018/028396 dated Jul. 23, 2018.

International Search Report for International Application No. PCT/US2018/028400 dated Jun. 27, 2018.

Written Opinion for International Application No. PCT/US2018/028400 dated Jun. 27, 2018.

International Search Report for International Application No. PCT/US2018/028410 dated Jun. 27, 2018.

Written Opinion for International Application No. PCT/US2018/028410 dated Jun. 27, 2018.

Wireless Power Transfer for Light-Duty Plug-in/Electric Vehicles and Alignment Methodology, SAE International, J2954, Apr. 2019, pp. 1-172.

Wireless Power Transfer for Light-Duty Plug-in/Electric Vehicles and Alignment Methodology, SAE International, J2954, Nov. 2017, pp. 1-150.

Wireless Power Transfer for Light-Duty Plug-in/Electric Vehicles and Alignment Methodology, SAE International, J2954, May 2016, pp. 1-115.

Use Cases for Wireless Charging Communication for Plug-in Electric Vehicles, SAE International, J2836/6, May 2013, pp. 1-20.

Wireless Power Transfer for Light-Duty Plug-in/Electric Vehicles and Alignment Methodology, SAE International, J2954, Oct. 2020, pp. 1-194.

Use Cases for Wireless Charging Communication for Plug-in Electric Vehicles, SAE International, J2836/6, Apr. 2021, pp. 1-20.

\* cited by examiner

INTELLIGENT VEHICLE CHARGING STATION

CROSS REFERENCE TO RELATED APPLICATION

This application claims the benefit under 35 U.S.C. § 119(e) of U.S. Provisional Application No. 62/487,220 filed on Apr. 19, 2017, which is hereby incorporated by reference in its entirety.

TECHNICAL FIELD

The present application generally relates to augmenting the operation of autonomous vehicles, and more particularly relates to systems and methods for charging autonomous vehicles utilizing a network of charging stations dispersed around a geographic area.

BACKGROUND

Systems have been developed for charging of autonomous vehicles, but they generally lack the intelligence to allow automatic unattended autonomous vehicle charging, especially for a fleet of autonomous vehicles utilizing a network of charging stations. In the context of the present application, autonomous vehicle refers to a vehicle equipped with an automated driving system capable of performing all aspects of dynamic driving that can be managed by a human driver.

SUMMARY

The present application is directed to an intelligent vehicle charging system and method for charging a fleet of autonomous vehicles throughout a network of charging stations dispersed throughout a geographic area. The intelligent vehicle charging system maximizes the overall efficiency of the fleet of autonomous vehicles by ensuring that the autonomous vehicles in the fleet are adequately charged and minimizing downtime for the autonomous vehicles in the field.

The intelligent vehicle charging system includes a remote control system that is in operative communication with each of the autonomous vehicles in the fleet and each of the charging stations in the network. When an autonomous vehicle is in need of a power charge, the remote control system will identify an available charging station, guide the autonomous vehicle to the charging station, verify that the autonomous vehicle has arrived at the charging station, initiate the power charging process, account and bill appropriate fees for the charging process, and log all associated activity.

The remote control system sends the autonomous vehicle the station location data 266 for the charging station (e.g., GPS coordinates), so that the autonomous driving system of the autonomous vehicle can drive the autonomous vehicle to the charging station. Although an autonomous vehicle may be generally guided to a charging station using conventional positioning systems (e.g., GPS), conventional positioning systems do not provide the accuracy necessary to properly align an autonomous vehicle for wireless power charging at a charging station. The intelligent vehicle charging system further includes one or more beacons at the charging station that transmit alignment signals for aligning the vehicle at the charging station or station lane. Once the autonomous vehicle arrives at the charging station, the autonomous vehicle locks onto the beacon alignment signals that provide terminal guidance into a specifically assigned charging station/charging lane.

Once the autonomous vehicle is guided to the charging station, the intelligent vehicle charging system identifies the autonomous vehicle, authenticates the autonomous vehicle, verifies the autonomous vehicle's payment account, and then automatically begins the power charging process. At the conclusion (or at any interrupted point) of the power charging process, the autonomous vehicle drives away from the charging station and the intelligent vehicle charging system charges the appropriate fee to the autonomous vehicle's payment account. Thus, the intelligent vehicle charging system allows an autonomous vehicle to drive up to a specified charging station and conduct an autonomous power charging session without any live (human) direction, intervention, or assistance.

Intelligent Vehicle Charging System

In one embodiment, an intelligent vehicle charging system and method of operating the intelligent vehicle charging system for charging a fleet of autonomous vehicles throughout a network of charging stations includes vehicle charging equipment installed on each autonomous vehicle, station charging equipment installed at each charging station, and a remote control system in communication with the vehicle charging equipment on each autonomous vehicle and the station charging equipment at each charging station. The vehicle charging equipment includes a vehicle charging control system and a power receiving system operably connected to the vehicle charging control system. The vehicle charging control system transmits to the remote control system a unique vehicle ID, real-time vehicle location data and real-time power charge status data (e.g., available power pack capacity) corresponding to the autonomous vehicle on which the vehicle charging control system is installed. The station charging equipment includes a power transmitting system connected to a power supply and a station charging control system operably connected to the power transmitting system. The station charging control system transmits to the remote control system a unique station ID, station location data and real-time station/lane availability data corresponding to the charging station where the station charging control system is installed. The remote control system directs a selected autonomous vehicle to a selected charging station for a power charging session and sends the station location data for the selected charging station to the vehicle charging control system of the selected autonomous vehicle for guiding the autonomous vehicle to the charging station. The station charging control system at the selected charging station transmits alignment signals to the vehicle charging control system of the selected autonomous vehicle for aligning the autonomous vehicle with respect to the power transmitting system at the selected charging station. The power transmitting system at the selected charging station transfers electric power to the power receiving system of the selected autonomous vehicle.

In some of the embodiments of the above intelligent vehicle charging system and method of operating the intelligent vehicle charging system, the remote control system transmits to the vehicle charging control system of the selected autonomous vehicle the station ID corresponding to the selected charging station; and the vehicle charging control system uses the alignment signals only from the selected charging station associated with the received station ID for aligning the autonomous vehicle with respect to the power transmitting system at the charging station.

In some of the embodiments of the above intelligent vehicle charging system and method of operating the intelligent vehicle charging system, the station charging control system includes one or more beacons located at each charging station; and the one or more beacons at the selected charging station transmit the alignment signals to the vehicle charging control system of the selected autonomous vehicle, or in the case of multiple charging equipment, the alignment to a designated charging lane.

In some of the embodiments of the above intelligent vehicle charging system and method of operating the intelligent vehicle charging system, the station charging control system includes one or more sensors located at each charging station; and the one or more sensors detect the presence of the selected autonomous vehicle at the selected charging station.

In some of the embodiments of the above intelligent vehicle charging system and method of operating the intelligent vehicle charging system, the station charging control system includes one or more sensors located at each charging station; and the one or more sensors detect the presence of an autonomous vehicle at a corresponding charging station to provide real-time charging station availability data to the remote control system.

In some of the embodiments of the intelligent vehicle charging system and method of operating the intelligent vehicle charging system, the vehicle charging control system sends the station charging control system the vehicle ID for the autonomous vehicle present at the charging station.

In some of the embodiments of the above intelligent vehicle charging system and method of operating the intelligent vehicle charging system, the station charging control system sends the remote control system the vehicle ID for the autonomous vehicle present at the charging station and the station ID of the charging station; and the remote control system authenticates the vehicle ID of the autonomous vehicle present at the charging station based on the vehicle ID of the selected autonomous vehicle and the station ID of the selected charging station that are assigned to each other.

In some of the embodiments of the above intelligent vehicle charging system and method of operating the intelligent vehicle charging system, the power transmitting system at the selected charging station automatically transfers electric power to the power receiving system of the selected autonomous vehicle after the vehicle ID is authenticated.

In some of the embodiments of the above intelligent vehicle charging system and method of operating the intelligent vehicle charging system, the remote control system sends the vehicle ID for the selected autonomous vehicle to the selected charging station; and the station charging control system at the selected charging station authenticates the vehicle ID from the autonomous vehicle present at the selected charging station based on the vehicle ID for the selected autonomous vehicle received from the remote control system.

In some of the embodiments of the above intelligent vehicle charging system and method of operating the intelligent vehicle charging system, the power transmitting system at the selected charging station automatically transfers electric power to the power receiving system of the selected autonomous vehicle after the vehicle ID is authenticated.

In some of the embodiments of the above intelligent vehicle charging system and method of operating the intelligent vehicle charging system, the station charging control system at the selected charging station monitors the power transferred to the selected autonomous vehicle and transmits to the remote control system power data about the power transferred to the selected autonomous vehicle.

In some of the embodiments of the above intelligent vehicle charging system and method of operating the intelligent vehicle charging system, the remote control system stores information for a billing or payment account associated with each of the autonomous vehicles; and the remote control system charges a fee for the power charging session to the billing or payment account associated with the selected autonomous vehicle based on the power data received from the charging control system at the selected charging station about the power transferred to the selected autonomous vehicle.

In some of the embodiments of the above intelligent vehicle charging system and method of operating the intelligent vehicle charging system, the vehicle charging control system is operably connected to an autonomous driving system of the autonomous vehicle.

In some of the embodiments of the above intelligent vehicle charging system and method of operating the intelligent vehicle charging system, the vehicle charging control system transmits the station location data for the selected charging station to the autonomous driving system for guiding the autonomous vehicle to the selected charging station.

In some of the embodiments of the above intelligent vehicle charging system and method of operating the intelligent vehicle charging system, the vehicle charging control system transmits driving commands to the autonomous driving system based on the alignment signals for aligning the selected autonomous vehicle with respect to the power transmitting system at the selected charging station.

In some of the embodiments of the above system and method, the power receiving system is configured to be operably connected to a power storage system of the autonomous vehicle and is configured to transmit the power received from the power transmitting system at the charging station to the power storage system of the autonomous vehicle.

In some of the embodiments of the above intelligent vehicle charging system and method of operating the intelligent vehicle charging system, the power transmitting system at the charging station wirelessly transfers electric power to the power receiving system of the autonomous vehicle.

In some of the embodiments of the above intelligent vehicle charging system and method of operating the intelligent vehicle charging system, the power receiving system includes a receiver coil configured to be inductively coupled to a transmitter coil in the power transmitting system to wirelessly transfer electric power.

In some of the embodiments of the above system and method, the vehicle charging control system communicates with the remote control system via a wireless communication link.

In some of the embodiments of the above intelligent vehicle charging system and method of operating the intelligent vehicle charging system, the station charging control system sends the alignment signals to the vehicle charging control system via a wireless communication link.

In some of the embodiments of the above intelligent vehicle charging system and method of operating the intelligent vehicle charging system, the vehicle charging control system of each autonomous vehicle sends the remote control system the real-time vehicle location data corresponding to each autonomous vehicle.

In some of the embodiments of the above intelligent vehicle charging system and method of operating the intelligent vehicle charging system, the vehicle charging control system of each autonomous vehicle sends the remote control system the real-time power charge status data corresponding to each autonomous vehicle.

In some of the embodiments of the above intelligent vehicle charging system and method of operating the intelligent vehicle charging system, the remote control system terminates the power charging session based on the real-time power charge status data of the selected autonomous vehicle received from the vehicle charging control system of the selected autonomous vehicle.

In some of the embodiments of the above intelligent vehicle charging system and method of operating the intelligent vehicle charging system, the vehicle charging control system of the selected autonomous vehicle sends the station charging control system at the selected charging station the real-time power charge status data during the power charging session; the station charging control system at the selected charging station sends the remote control system the real-time power charge status data of the selected autonomous vehicle; and the remote control system terminates the power charging session based on the real-time power charge status data of the selected autonomous vehicle received from the station charging control system at the selected charging station.

In some of the embodiments of the above intelligent vehicle charging system and method of operating the intelligent vehicle charging system, the remote control system assigns the selected autonomous vehicle to the selected charging station for the power charging session based on the real-time power charge status data of the selected autonomous vehicle, the real-time vehicle location data for the selected autonomous vehicle, the station location data for the selected charging station and the real-time station availability data for the selected charging station.

Remote Control System

In one embodiment, a remote control system and method of operating the remote control system for charging an autonomous vehicle includes a computer server in communication with a plurality of autonomous vehicles and a plurality of charging stations. The computer server stores information about each of the autonomous vehicles and information about each of the charging stations. The information about each of the autonomous vehicles includes a unique vehicle ID for each autonomous vehicle, real-time vehicle location data for each autonomous vehicle and real-time power charge status data (e.g., available power pack capacity) for each autonomous vehicle. The information about each of the charging stations includes a unique station ID for each charging station, station location data for each charging station and real-time station availability data for each charging station. The computer server assigns a selected autonomous vehicle to a selected charging station for a power charging session and sends the station location data for the selected charging station to the selected autonomous vehicle for guiding the autonomous vehicle to the charging station.

In some embodiments of the above remote control system and method of operating the remote control system for charging an autonomous vehicle, the computer server sends the station ID for the selected charging station to the selected autonomous vehicle for guiding the autonomous vehicle to the charging station.

In some embodiments of the above remote control system and method of operating the remote control system for charging an autonomous vehicle, the computer server receives the real-time vehicle location data from each autonomous vehicle.

In some embodiments of the above remote control system and method of operating the remote control system for charging an autonomous vehicle, the computer server receives the real-time power charge status data from each autonomous vehicle.

In some embodiments of the above remote control system and method of operating the remote control system for charging an autonomous vehicle, the computer server receives the real-time power charge status data of the selected autonomous vehicle from the selected charging station.

In some embodiments of the above remote control system and method of operating the remote control system for charging an autonomous vehicle, the computer server terminates the power charging session based on the real-time power charge status data of the selected autonomous vehicle received from the selected charging station.

In some embodiments of the above remote control system and method of operating the remote control system for charging an autonomous vehicle, the computer server assigns the selected autonomous vehicle to the selected charging station for the power charging session based on the real-time power charge status data of the selected autonomous vehicle, the real-time vehicle location data for the selected autonomous vehicle, the station location data for the selected charging station and the real-time station availability data for the selected charging station.

In some embodiments of the above remote control system and method of operating the remote control system for charging an autonomous vehicle, the computer server receives from the charging station availability data based on whether there is an autonomous vehicle present at the charging station.

In some embodiments of the above remote control system and method of operating the remote control system for charging an autonomous vehicle, the computer server sends the vehicle ID for the selected autonomous vehicle to the selected charging station for authenticating the autonomous vehicle at the charging station.

In some embodiments of the above remote control system and method of operating the remote control system for charging an autonomous vehicle, the computer server receives from the charging station the vehicle ID for the autonomous vehicle present at the charging station and the station ID of the charging station.

In some embodiments of the above remote control system and method of operating the remote control system for charging an autonomous vehicle, the computer server authenticates the vehicle ID of the autonomous vehicle present at the charging station based on the vehicle ID of the selected autonomous vehicle and the station ID of the selected charging station that are assigned to each other.

In some embodiments of the above remote control system and method of operating the remote control system for charging an autonomous vehicle, the computer server receives from the selected charging station power data about the power transferred to the selected autonomous vehicle during the power charging session.

In some embodiments of the above remote control system and method of operating the remote control system for charging an autonomous vehicle, the computer server stores information for a billing account associated with each of the autonomous vehicles and charges a fee for the power charging session to the billing account associated with the selected autonomous vehicle based on the power data received from the charging control system at the selected charging station about the power transferred to the selected autonomous vehicle.

Vehicle Charging Equipment

In one embodiment, charging equipment for an autonomous vehicle and a method of operating the charging equipment for the autonomous vehicle includes a vehicle charging control system configured to be operably connected to the autonomous vehicle and a power receiving system configured to be operably connected to the autonomous vehicle. The vehicle charging control system communicates with a remote control system to receive station location data for a charging station for guiding the autonomous vehicle to the charging station/charging lane. The power receiving system receives electric power from a power transmitting system at the charging station and transfers electric power to the autonomous vehicle. The vehicle charging control system receives alignment signals from the charging station for aligning the autonomous vehicle with respect to the power transmitting system at the charging station/lane.

In some embodiments of the above charging equipment for the autonomous vehicle and a method of operating the charging equipment for the autonomous vehicle, the vehicle charging control system communicates with the remote control system to receive a unique station ID associated with the charging station and uses the alignment signals only from the charging station associated with the station ID for aligning the autonomous vehicle with respect to the power transmitting system at the charging station/lane.

In some embodiments of the above charging equipment for the autonomous vehicle and a method of operating the charging equipment for the autonomous vehicle, the vehicle charging control system is configured to be operably connected to an autonomous driving system of the autonomous vehicle.

In some embodiments of the above charging equipment for the autonomous vehicle and a method of operating the charging equipment for the autonomous vehicle, the vehicle charging control system transmits the station location data for the charging station to the autonomous driving system for guiding the autonomous vehicle to the charging station.

In some embodiments of the above charging equipment for the autonomous vehicle and a method of operating the charging equipment for the autonomous vehicle, the vehicle charging control system transmits driving commands to the autonomous driving system based on the alignment signals for aligning the autonomous vehicle with respect to the power transmitting system at the charging station.

In some embodiments of the above charging equipment for the autonomous vehicle and a method of operating the charging equipment for the autonomous vehicle, the power receiving system is configured to be operably connected to a power storage system of the autonomous vehicle and is configured to transmit the power received from the power transmitting system at the charging station to the power storage system of the autonomous vehicle.

In some embodiments of the above charging equipment for the autonomous vehicle and a method of operating the charging equipment for the autonomous vehicle, the power receiving system wirelessly receives electric power from the power transmitting system at the charging station.

In some embodiments of the above charging equipment for the autonomous vehicle and a method of operating the charging equipment for the autonomous vehicle, the power receiving system includes a receiver coil configured to be inductively coupled to a transmitter coil in the power transmitting system to wirelessly transfer electric power.

In some embodiments of the above charging equipment for the autonomous vehicle and a method of operating the charging equipment for the autonomous vehicle, the vehicle charging control system communicates with the remote control system via a wireless communication link and the vehicle charging control system receives the alignment signals via a wireless communication link.

In some embodiments of the above charging equipment for the autonomous vehicle and a method of operating the charging equipment for the autonomous vehicle, wherein the vehicle charging control system transmits power charge status data of the autonomous vehicle to the remote control system and a station charging control system at the charging station.

In some embodiments of the above charging equipment for the autonomous vehicle and a method of operating the charging equipment for the autonomous vehicle, the vehicle charging control system transmits real-time vehicle location data for the autonomous vehicle to the remote control system.

Charging Station

In one embodiment, an autonomous vehicle charging facility and method of operating the autonomous vehicle charging facility includes one or more charging stations/charging lanes, a power transmitting system located at each charging station/charging lane, the power transmitting system being connected to a power supply, and a station charging control system operably connected to the power transmitting system at each charging station/charging lane. The station charging control system is configured to communicate with a remote control system to receive a vehicle ID for a selected autonomous vehicle assigned to a selected charging station/charging lane for a power charging session. The station charging control system is configured to transmit alignment signals to the selected autonomous vehicle for aligning the autonomous vehicle with respect to the power transmitting system at the selected charging station/charging lane. The power transmitting system is configured to transfer electric power to the autonomous vehicle.

In some embodiments of the above autonomous vehicle charging facility and method of operating the autonomous vehicle charging facility, the station charging control system includes one or more beacons located at each charging station/charging lane, where the one or more beacons at the selected charging station/charging lane transmit the alignment signals to the selected autonomous vehicle.

In some embodiments of the above autonomous vehicle charging facility and method of operating the autonomous vehicle charging facility, the station charging control system includes one or more sensors located at each charging station/charging lane, which detect the presence of the selected autonomous vehicle at the selected charging station/charging lane.

In some embodiments of the above autonomous vehicle charging facility and method of operating the autonomous vehicle charging facility, the station charging control system receives the vehicle ID from the selected autonomous vehicle at the selected charging station/charging lane.

In some embodiments of the above autonomous vehicle charging facility and method of operating the autonomous vehicle charging facility, the station charging control system is programmed with a unique charging station ID corresponding to each charging station/charging lane and the station charging control system transmits the vehicle ID and charging station ID to the remote control system for the selected autonomous vehicle present at the selected charging station/charging lane.

In some embodiments of the above autonomous vehicle charging facility and method of operating the autonomous vehicle charging facility, the station charging control system authenticates the vehicle ID from the autonomous vehicle at the charging station/charging lane based on the vehicle ID for the selected autonomous vehicle assigned to the charging station/charging lane, which is received from the remote control system.

In some embodiments of the above autonomous vehicle charging facility and method of operating the autonomous vehicle charging facility, the power transmitting system automatically transfers electric power to the autonomous vehicle after the vehicle ID is authenticated.

In some embodiments of the above autonomous vehicle charging facility and method of operating the autonomous vehicle charging facility, the station charging control system monitors the power transferred to the autonomous vehicle and transmits power data about the power transferred to the autonomous vehicle to the remote control system.

In some embodiments of the above autonomous vehicle charging facility and method of operating the autonomous vehicle charging facility, the power transmitting system wirelessly transfers electric power to the autonomous vehicle.

In some embodiments of the above autonomous vehicle charging facility and method of operating the autonomous vehicle charging facility, the power transmitting system includes a transmitter coil configured to be inductively coupled to a receiver coil in the autonomous vehicle to wirelessly transfer electric power.

In some embodiments of the above autonomous vehicle charging facility and method of operating the autonomous vehicle charging facility, the station charging control system receives power charge status data (e.g., available power pack capacity) for the autonomous vehicle from the vehicle charging control system during the power charging session.

In some embodiments of the above autonomous vehicle charging facility and method of operating the autonomous vehicle charging facility, the station charging control system terminates the power charging session based on the power charge status data of the autonomous vehicle.

In some embodiments of the above autonomous vehicle charging facility and method of operating the autonomous vehicle charging facility, the station charging control system transmits the power charge status data for the autonomous vehicle to the remote control system.

BRIEF DESCRIPTION OF THE DRAWINGS

The foregoing summary, as well as the following detailed description, is better understood when read in conjunction with the appended drawings. For the purpose of illustrating the invention, exemplary embodiments are shown in the drawings, it being understood, however, that the present application is not limited to the specific embodiments disclosed. In the drawings.

DETAILED DESCRIPTION

Figure 1:
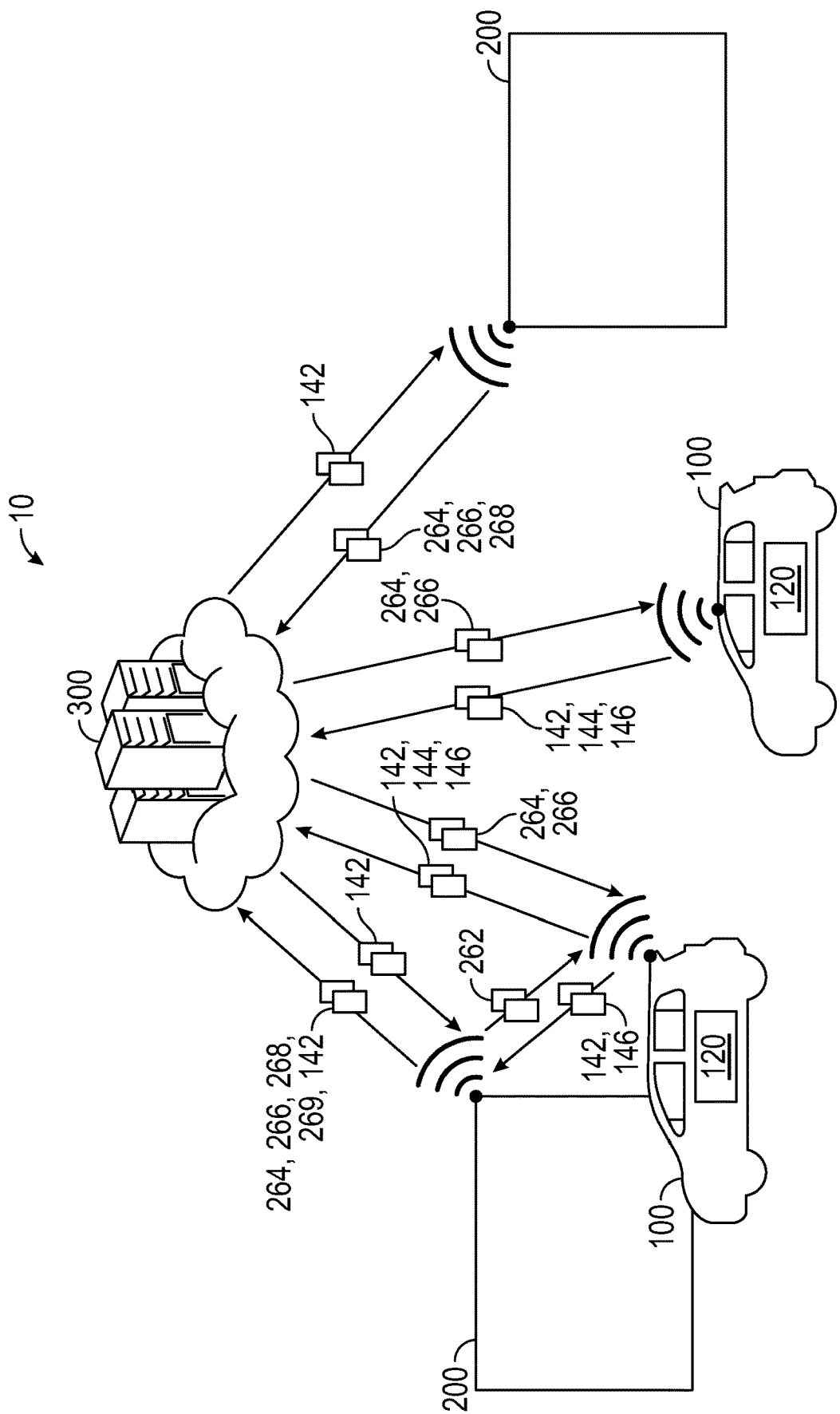
FIG. 1 shows a schematic diagram of an exemplary intelligent vehicle charging system.

Before the various exemplary embodiments are described in further detail, it is to be understood that the invention is not limited to the particular embodiments described. It is also to be understood that the terminology used is for the purpose of describing particular embodiments only, and is not intended to limit the scope of the claims of the present application.

In the drawings, like reference numerals refer to like features of the systems and methods of the present application. Accordingly, although certain descriptions may refer only to certain figures and reference numerals, it should be understood that such descriptions might be equally applicable to like reference numerals in other figures.

The present application is directed to an intelligent vehicle charging system 10 for charging a fleet of autonomous vehicles 100 throughout a network of charging stations dispersed throughout a geographic area. The intelligent vehicle charging system 10 communicates with each of the autonomous vehicles 100 in the fleet and each of the charging stations in the network. When an autonomous vehicle 100 is in need of a power charge, intelligent vehicle charging system 10 identifies an available charging station, guides the autonomous vehicle 100 to the charging station or charging lane, verifies that the autonomous vehicle 100 has arrived at the charging station/charging lane, initiates the power charging process, accounts and bills appropriate fees for the charging process, and logs all associated activity.

As shown in FIG. 1, intelligent vehicle charging system 10 comprises vehicle charging equipment 120 installed on each autonomous vehicle 100 in the fleet, a network of charging facilities 200, and a remote control system 300 in communication with the vehicle charging equipment 120 on the fleet of autonomous vehicles 100 and with the network of charging facilities 200. Autonomous vehicles 100 may be electric vehicles with electric power storage systems (e.g., electric battery packs) and charging facilities 200 may include electric charging stations/charging lanes for transferring electric power to autonomous vehicles 100.

Figure 2:
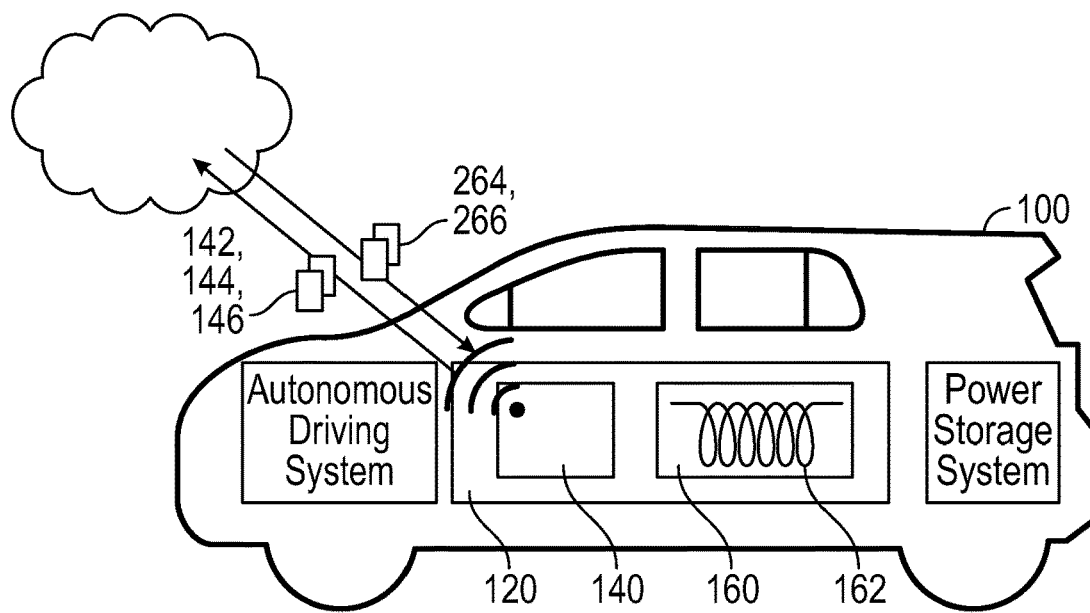
FIG. 2 shows a schematic diagram of vehicle charging equipment of the exemplary intelligent vehicle charging system of FIG. 1.

As shown in FIG. 2, vehicle charging equipment 120 on each autonomous vehicle 100 includes a vehicle charging control system 140 and a power receiving system 160 that are operably connected to each other. Vehicle charging control system 140 is configured to be operably connected to an autonomous driving system of the autonomous vehicle 100. Power receiving system 160 is configured to be operably connected to a power storage system (e.g., electric battery pack) of the autonomous vehicle 100 to transmit power received from charging facility 200 to the power storage system of the autonomous vehicle 100. Power receiving system 160 includes a receiver coil 162 configured to be inductively coupled to a transmitter coil at charging facility 200 to wirelessly transfer electric power to the autonomous vehicle 100.

Vehicle charging control systems 140 of the autonomous vehicles 100 communicate with charging facilities 200 and remote control system 300 to send and receive the necessary data for guiding and charging the fleet of autonomous vehicles 100. Vehicle charging control systems 140 communicate with charging facilities 200 via wireless communication links established by means of suitable communication protocols (e.g., BLUETOOTH®, WI-FI®, ZIGBEE®, etc.). Also, vehicle charging control systems 140 communicate with the remote control system 300 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly.

The functions of vehicle charging control systems 140 described herein may be implemented using computer applications comprising computer program code stored in a computer-readable medium that is executed by a computer processor. The functions of vehicle charging control systems 140 described herein may also be implemented in programmable hardware devices such as field programmable gate arrays, programmable array logic, programmable logic devices or the like. Further, functions of vehicle charging control systems 140 described herein may be implemented using some combination of computer program(s) executed by a computer processor and programmable hardware devices. Thus, vehicle charging control systems 140 of the present application comprise suitable computer hardware and software for performing the desired functions and are not limited to any specific combination of hardware and software.

Figure 3:
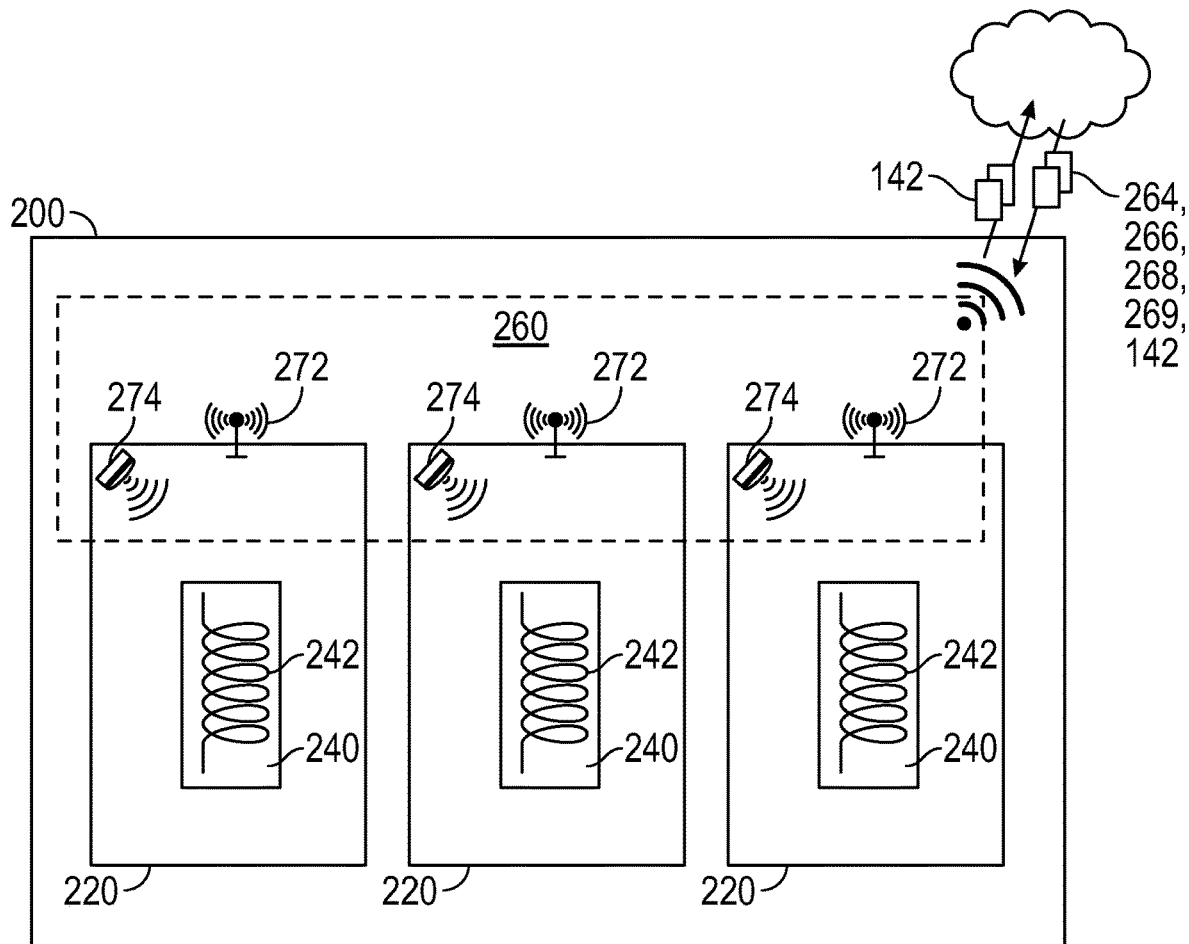
FIG. 3 shows a schematic diagram of a charging facility of the exemplary intelligent vehicle charging system of FIG. 1.

As shown in FIG. 3, each charging facility 200 in the network includes one or more charging stations/lanes 220, a power transmitting system 240 at each charging station/lane 220, and a station charging control system 260 operably connected to the power transmitting system 240 at each charging station/lane 220. Station charging control system 260 includes one or more beacons 272 located at each charging station/lane 220 to transmit alignment signals 262 to vehicle charging control system 140 of an autonomous vehicle 100 for properly aligning the autonomous vehicle 100 at charging station 220 for charging. Beacons 272 wirelessly transmit alignment signals 262 to vehicle charging control system 140 of an autonomous vehicle 100 using any suitable communication protocols (e.g., BLUETOOTH®, WI-FI®, ZIGBEE®, etc.). Station charging control system 260 also includes one or more sensors at each charging station 220 for detecting the presence of an autonomous vehicle 100 at the charging station 220 and providing real-time charging station availability data to remote control system 300. Power transmitting system 240 at each charging station 220 includes a transmitter coil 242 configured to be inductively coupled to receiver coil 162 in power receiving system 160 of an autonomous vehicle 100 to wirelessly transfer electric power to the autonomous vehicle 100. The wireless transfer of electric power from charging stations 220 to the autonomous vehicles 100 may be implemented using known wireless charging systems for electric vehicles such as, for example, the systems described in U.S. Pat. No. 8,975,864 and U.S. Patent Application Publication 2016/0075249, which are herein incorporated by reference.

Station charging control systems 260 of charging stations 220 communicate with vehicle charging control systems 140 of the autonomous vehicles 100 and remote control system 300 to send and receive the necessary data for guiding and charging the fleet of autonomous vehicles 100. Station charging control systems 260 of charging stations 220 communicate with vehicle charging control systems 140 of the autonomous vehicles 100 via wireless communication links established by means of suitable communication protocols (e.g., BLUETOOTH®, WI-FI®, ZIGBEE®, etc.). Also, station charging control systems 260 of charging stations 220 communicate with remote control system 300 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly.

The functions of station charging control systems 260 described herein may be implemented using computer applications comprising computer program code stored in a computer-readable medium that is executed by a computer processor. The functions of station charging control systems 260 described herein may also be implemented in programmable hardware devices such as field programmable gate arrays, programmable array logic, programmable logic devices or the like. Further, functions of station charging control systems 260 described herein may be implemented using some combination of computer program(s) executed by a computer processor and programmable hardware devices. Thus, station charging control systems 260 of the present application comprise suitable computer hardware and software for performing the desired functions and are not limited to any specific combination of hardware and software.

Figure 4:
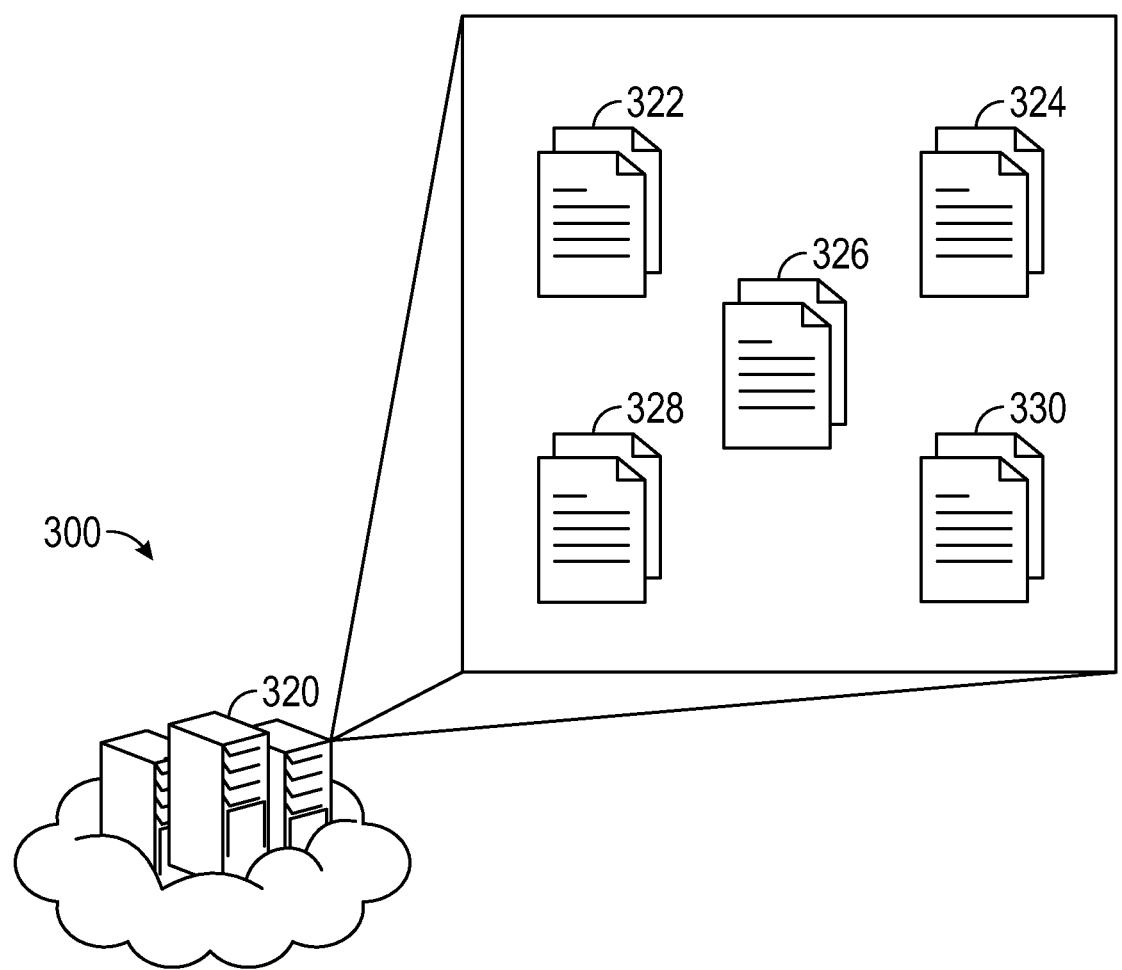
FIG. 4 shows a schematic diagram of a remote control system of the exemplary intelligent vehicle charging system of FIG. 1.

As shown in FIG. 4, the remote control system 300 includes one or more computer servers 320 in a centralized or distributed computing architecture. The functions of computer server 320 described herein may be implemented using computer applications comprising computer program code stored in a computer-readable medium that is executed by a computer processor. The functions of computer server 320 described herein may also be implemented in programmable hardware devices such as field programmable gate arrays, programmable array logic, programmable logic devices or the like. Further, functions of computer server 320 described herein may be implemented using some combination of computer program(s) executed by a computer processor and programmable hardware devices. Thus, computer server 320 of the present application comprises suitable computer hardware and software for performing the desired functions and are not limited to any specific combination of hardware and software.

The executable computer program code may comprise one or more physical or logical blocks of computer instructions, which may be organized as an object, procedure, process or function. For example, the executable computer program code may be distributed over several different code partitions or segments, among different programs, and across several devices. Accordingly, the executable computer program need not be physically located together, but may comprise separate instructions stored in different locations which, when joined logically together, comprise the computer application and achieve the stated purpose for the computer application.

Computer server 320 stores and maintains vehicle records 322 for each of the autonomous vehicles 100 in the fleet, station records 324 for each of the charging stations in the network, session records 326 for each power charging session, billing or payment account records 328 for each of the autonomous vehicles 100 in the fleet, and an activity log 330 for all monitored activity in intelligent vehicle charging system 10. Vehicle records 322 may include a unique vehicle ID 142 for each autonomous vehicle 100, real-time vehicle location data 144 for each autonomous vehicle 100 (e.g., GPS coordinates), real-time power charge status data 146 for each autonomous vehicle 100, and scheduled passenger request for each autonomous vehicle 100. The real-time power charge status data 146 includes a measure of power available in the autonomous vehicle 100 (e.g., power storage system of the autonomous vehicle) such as, for example, vehicle travel distance range, percentage of battery capacity available, units of available power or energy, etc. Station records 324 may include a unique station ID 264 for each charging station, station location data 266 for each charging station, real-time station availability data 268 for each charging station, and scheduled power charging sessions for each charging station. Session records 326 include vehicle ID 142, station ID 264 and power data 269 about the power transferred (e.g., units of power or energy) for power charging sessions of the autonomous vehicles 100 at charging stations 220. Billing or payment account records 328 include verified billing or payment accounts for processing billing or payment of fees for power charging sessions of the autonomous vehicles 100 at charging stations 220.

Computer server 320 communicates with vehicle charging control systems 140 of the fleet of autonomous vehicles 100 and with station charging control systems 260 in the network of charging stations 220 to send and receive the necessary data for guiding and charging the fleet of autonomous vehicles 100. Vehicle charging control system 140 transmits to remote control system 300 vehicle ID 142, real-time vehicle location data 144 and real-time power charge status data 146 corresponding to the autonomous vehicle 100 on which vehicle charging control system 140 is installed. Station charging control system 260 transmits to remote control system 300 station ID 264, station location data 266 and real-time station availability data 268 corresponding to the charging station where station charging control system 260 is installed. Remote control system 300 communicates with station charging control systems 260 of charging stations 220 via communication links that are established by means of suitable communication protocols (e.g., BLUETOOTH®, WI-FI®, ZIGBEE®, Ethernet, SAP®, SAS®, ATP, GSM, TCP/IP, etc.). Remote control system 300 communicates with vehicle charging control systems 140 of the autonomous vehicles 100 via communication links that are established by means of suitable communication protocols (e.g., BLUETOOTH®, WI-FI®, ZIGBEE®, Ethernet, SAP®, SAS®, ATP, GSM, TCP/IP, etc.) and are, at least in part, established wirelessly.

Figure 5:
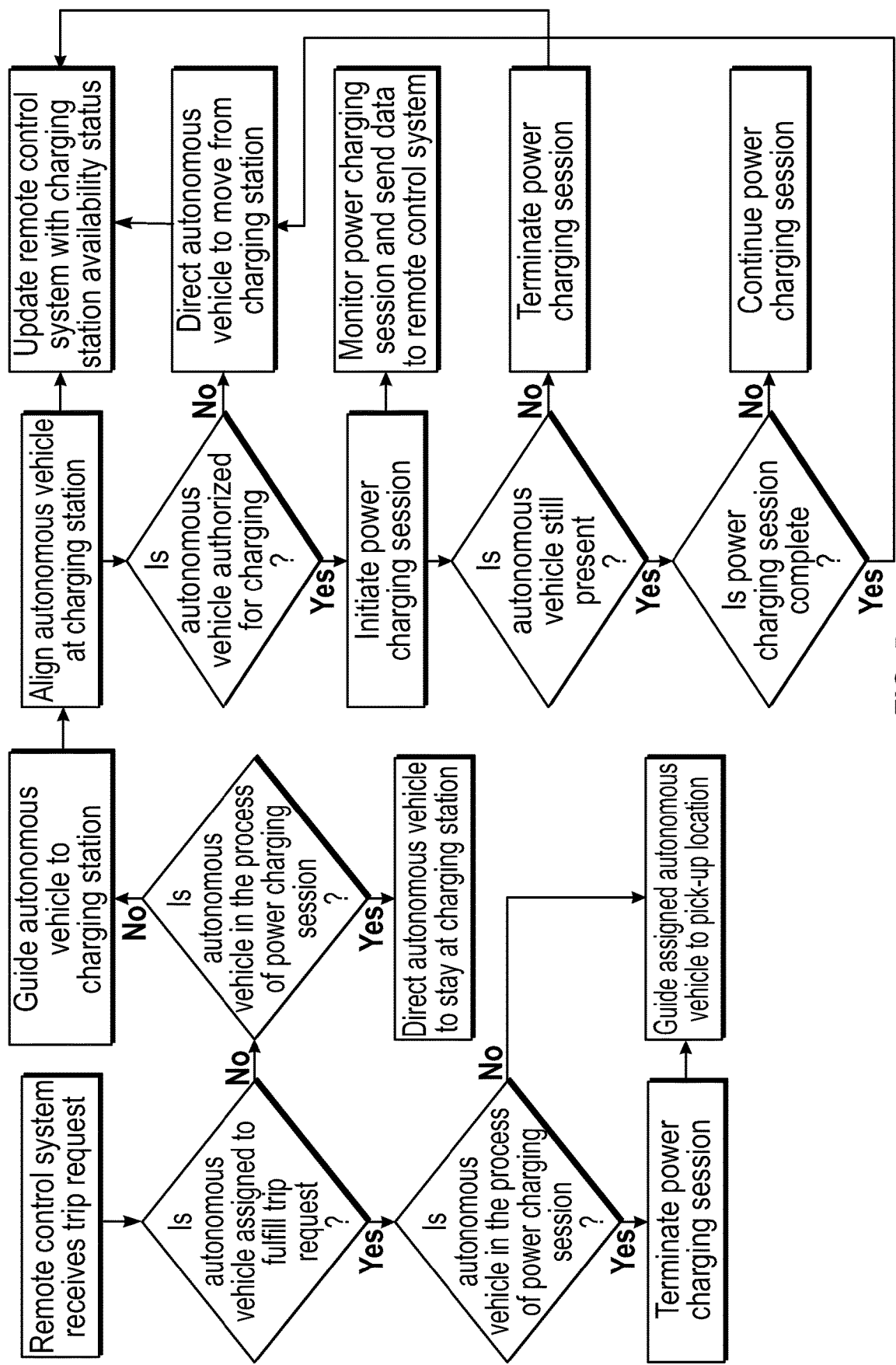
FIG. 5 shows an exemplary flow diagram for the operation of the exemplary intelligent vehicle charging system of FIG. 1.

As shown in FIG. 5, in operation, computer server 320 receives an autonomous vehicle trip request from a user, which includes a pick-up location, a drop-off location and any intervening stop location(s). After receiving an autonomous vehicle request, computer server 320 communicates with autonomous vehicles 100 in the fleet and determines the location of each autonomous vehicles 100 in the fleet based on real-time vehicle location data 144 received from autonomous vehicles 100 and determines the power charge status (e.g., battery charge level) of each autonomous vehicles 100 in the fleet based on real-time power charge status data 146. Computer server 320 determines the proximity of each autonomous vehicle 100 in the fleet to the pick-up location for the autonomous vehicle trip request, and determines which autonomous vehicle(s) 100 has sufficient power charge to fulfill the autonomous vehicle trip request and drive to a charging station 220 after the trip is completed. Computer server 320 assigns an autonomous vehicle 100 that is located closest to the pick-up location and that has sufficient power charge to fulfill the autonomous vehicle trip request and drive to a charging station 220 after the trip is completed. In accordance with the present invention, an autonomous vehicle 100 may be selected for a trip request even if it is in the process of re-charging. For example, if the assigned autonomous vehicle 100 is in the process of a power charging session, computer server 320 terminates the power charging session by directing charging station 220 where the vehicle is charging to terminate the power charging session or by directing the assigned autonomous vehicle 100 to simply drive off to the pick-up location from charging station 220 where the vehicle is charging.

Because computer server 320 monitors real-time power charge status data 146 for each autonomous vehicle 100 in the fleet, computer server 320 can efficiently manage the fleet of autonomous vehicles 100 by optimally assigning an autonomous vehicle 100 for an autonomous vehicle trip request. The assignment of an autonomous vehicle 100 for an autonomous vehicle trip request can be made whether the autonomous vehicle 100 is in the process of a power charging session or not. Depending on demand and vehicle availability, a particular autonomous vehicle 100 might never be fully charged. The completely automated and wireless features of the power charging process allows an instantaneous and dynamic "drive off" of autonomous vehicle 100 during a power charging session. Computer server 320 may also be programmed to require an optimal number of autonomous vehicles 100 to be charged to a certain level to potentially accommodate extended trips.

Also, if an autonomous vehicle 100 has a power charge status below a certain pre-defined level and/or has some down-time (i.e., does not have a scheduled passenger pick-up request) and there is an available charging station 220 within close proximity of the vehicle's location, then computer server 320 may assign autonomous vehicle 100 to charging station 220 for a power charging session. Computer server 320 monitors the real-time power charge status data 146 of the autonomous vehicles 100 in the fleet and the real-time station availability data 268 of charging stations 220 in the network to assign a selected autonomous vehicle 100 to a selected charging station/lane 220 for a power charging session. Computer server 320 assigns a selected autonomous vehicle 100 to a selected charging station/lane 220 for the power charging session based on the real-time power charge status data 146 of the selected autonomous vehicle 100, the real-time vehicle location data 144 for the selected autonomous vehicle 100, the station location data 266 for the selected charging station/lane 220 and the real-time station availability data 268 for the selected charging station/lane 220. Once a selected autonomous vehicle 100 is assigned to a selected charging station/lane 220 for a power charging session, computer server 320 sends station location data 266 for selected charging station/lane 220 to selected autonomous vehicle 100 for guiding autonomous vehicle 100 to charging station 220. More particularly, computer server 320 may send GPS coordinates corresponding to the location of selected charging station 220 to vehicle charging control system 140 of selected autonomous vehicle 100. Vehicle charging control system 140 of selected autonomous vehicle 100, which is operably connected to an autonomous driving system of the autonomous vehicle, transmits the station location data 266 (e.g., GPS coordinates) for selected charging station 220 to the autonomous driving system for guiding selected autonomous vehicle 100 to the selected charging station 220.

Further, computer server 320 sends the station ID 264 for selected charging station/lane 220 to selected autonomous vehicle 100 for aligning autonomous vehicle 100 for charging at selected charging station/lane 220. Once autonomous vehicle 100 arrives at charging facility 200 of selected charging station/lane 220, vehicle charging control system 140 of selected autonomous vehicle 100 locks onto the alignment signals 262 corresponding to the station ID 264 for selected charging station/lane 220 and uses only the alignment signals 262 corresponding to the station ID 264 for selected charging station/lane 220 for aligning the autonomous vehicle with respect to power transmitting system 240 at selected charging station/lane 220. Vehicle charging control system 140 transmits driving commands (e.g., vehicle-to-vehicle (V2V) and/or vehicle-to-infrastructure (V2I) commands such as, for example, start/stop, speed control, left/right directional correction, etc.) to the autonomous driving system of autonomous vehicle 100 based on the alignment signals 262 in order to guide and properly align selected autonomous vehicle 100 with respect to power transmitting system 240 at selected charging station/lane 220.

While the station location data 266 (e.g., GPS coordinates) for charging station 220 may be used to guide the vehicle to charging station 220, such station location data 266 typically only allows positioning of autonomous vehicle 100 in a general location of the charging station (typically within 25 feet from the desired location). However, autonomous vehicle 100 needs to be more accurately positioned with respect to power transmitting system 240 at selected charging station/lane 220 for wireless power charging, particularly for wireless power transmission such as, for example, wireless power transmission accomplished by inductively coupling transmitter coil 242 of power transmitting system 240 at charging station 220 with receiver coil 162 of power receiving system 160 in autonomous vehicle 100. Accordingly, the implementation of both station location data 266 and station alignment signals 262 advantageously bridges the gap between the initial guidance of autonomous vehicle 100 and the alignment accuracy needed to position selected autonomous vehicle 100 with respect to power transmitting system 240 at selected charging station/lane 220.

Also, once selected autonomous vehicle 100 is assigned to selected charging station/lane 220 for a power charging session, computer server 320 sends vehicle ID 142 for selected autonomous vehicle 100 to station charging control system 240 at selected charging station/lane 220 so that station charging control system 240 can authenticate autonomous vehicle 100 upon arrival at charging station 220. Station charging control system 260 at selected charging station/lane 220 transmits alignment signals 262, so that upon arrival of selected autonomous vehicle 100 to charging facility 200, vehicle charging control system 140 of selected autonomous vehicle 100 locks onto the alignment signals 262 corresponding to the station ID 264 for selected charging station/lane 220 for aligning selected autonomous vehicle 100 with respect to power transmitting system 240 at selected charging station/lane 220. Station charging control system 260 includes one or more beacons 272 located at each charging station 220, which transmit the alignment signals 262 to vehicle charging control system 140 to guide and properly align selected autonomous vehicle 100 with respect to power transmitting system 240 at selected charging station/lane 220.

Further, station charging control system 260 includes one or more sensors 274 located at each charging station 220, which detect the presence of an autonomous vehicle at charging station/lane 220 to provide real-time station availability data 268 to remote control system 300. Sensors 274 may be any suitable sensor for sensing the presence of autonomous vehicle 100 (e.g., magnetic field sensors, photobeam sensors, etc.). Station charging control system 260 sends remote control system 300 real-time station availability data 268, vehicle ID 142 for autonomous vehicle 100 present at charging station 220 with corresponding station ID 264. Remote control system 300 receives real-time station availability data 268, vehicle ID 142 for autonomous vehicle 100 and station ID 264 charging station 220 and records that charging station 220 with corresponding station ID 264 if occupied by autonomous vehicle 100 with corresponding vehicle ID 142.

When autonomous vehicle 100 is detected to be stopped and in position at charging station 220, station charging control system 260 at charging station 220 communicates with vehicle charging control system 140 of autonomous vehicle 100 to receive information including vehicle ID 142, real-time power charge status data 146, maintenance information, and other information as desired. Vehicle charging control system 140 of autonomous vehicle 100 communicates with station charging control system 260 at charging station 220 via wireless communication links established by means of suitable communication protocols (e.g., BLUETOOTH®, WI-FI®, ZIGBEE®, etc.).

Before the power charging session begins, autonomous vehicle 100 present at charging station 220 is authenticated. In one embodiment, remote control system receives from station charging control system 260 vehicle ID 142 for autonomous vehicle 100 present at charging station 220 and station ID 264 corresponding to charging station 220. Remote control system 300 authenticates vehicle ID 142 of autonomous vehicle 100 present at charging station 220 by verifying that vehicle ID 142 corresponds to an autonomous vehicle 100 of the system's fleet and that vehicle ID 142 corresponds to selected autonomous vehicle 100 assigned to station ID 264 of selected charging station/lane 220. In another embodiment, station charging control system 260 receives from remote control system 300 vehicle ID 142 for selected autonomous vehicle 100 assigned to the selected charging station/lane 220. Station charging control system 260 at selected charging station/lane 220 authenticates vehicle ID 142 from autonomous vehicle 100 present at selected charging station/lane 220 by verifying that vehicle ID 142 from autonomous vehicle 100 present at selected charging station/lane 220 corresponds to vehicle ID 142 for selected autonomous vehicle 220 received from remote control system 300.

Also, before the power charging session begins, billing or payment account for autonomous vehicle 100 present at charging station 220 is verified. Remote control system 300 verifies that there is a billing or payment account associated with vehicle ID 142 for selected autonomous vehicle 100 present at selected charging station/lane 220. After authentication of vehicle ID 142 and verification of billing or payment account for selected autonomous vehicle 100 present at selected charging station/lane 220, power transmitting system 240 at selected charging station/lane 220 automatically wirelessly transfers electric power to power receiving system 160 of selected autonomous vehicle 100. For example, station charging control system 260 at selected charging station/lane 220 may activate power supply to power transmitting system 240 such that transmitter coil 242 in power transmitting system 240 is inductively coupled to receiver coil 162 in power receiving system 160 of selected autonomous vehicle 100 to wirelessly transfer electric power to selected autonomous vehicle 100.

A power charging session of selected autonomous vehicle 100 at selected charging station/lane 220 may be terminated by remote control system 300 or by charging control system 260 at charging station 220. Remote control system 300 terminates the power charging session based on real-time power charge status data 146 (e.g., battery charge level) corresponding to selected autonomous vehicle 100, which may be received directly from selected autonomous vehicle 100 or from selected charging station/lane 220. Vehicle charging control system 140 of each autonomous vehicle 100 continuously or intermittently sends real-time power charge status data 146 (e.g., battery charge level) to remote control system 300. But also, during a power charging session, vehicle charging control system 140 of selected autonomous vehicle 100 transmits real-time power charge status data 146 (e.g., battery charge level) to charging control system 260 at selected charging station/lane 220, which charging control system 260 at selected charging station/lane 220 sends to remote control system 300. In order to terminate a power charging session, remote control system 300 directs station charging control system 260 to shut off power to power transmitting system 240 and commands vehicle charging control system 140 of autonomous vehicle 100 to drive away from charging station 220. After a power charging session is terminated and station charging control system 260 at charging station 220 detects the departure of autonomous vehicle 100, station charging control system 260 sends a message to remote control system 300 indicating that charging station 220 is available.

While typically autonomous vehicles 100 will stay at a charging station 220 until a full power charge is completed, there are circumstances that may affect or limit how long an autonomous vehicle 100 can practically be taken "off-line" for charging. For example, user requests for an autonomous vehicle 100 may demand that an autonomous vehicle 100 be delivered to a user before a full power charge is completed. Remote control system 300 reviews all available autonomous vehicles 100 in the fleet and determines whether an autonomous vehicle 100 in the middle of a charging cycle is the best option in accordance with certain parameters (e.g., geographic location, seating capacity, etc.). If remote control system 300 determines that an autonomous vehicle 100 in the process of a power charging session has sufficient charge to accommodate a user's request (e.g., pick-up, drop-off, and travel to a charging station thereafter), remote control system 300 may terminate the power charging session for autonomous vehicle 100 and direct autonomous vehicle 100 to drive to fulfill the user's request. Alternatively, autonomous vehicle 100 may simply terminate the power charging session by driving away from charging station 220. If station charging control system 260 at charging station 220 detects the departure of autonomous vehicle 100, station charging control system 260 automatically shuts off power to power transmitting system 240.

During a power charging session, station charging control system 260 at selected charging station/lane 220 monitors the power transferred to selected autonomous vehicle 100 and transmits to remote control system 300 power data 269 about the power transferred to selected autonomous vehicle 100 (e.g., units of power or energy). Remote control system 300 charges a fee for the power charging session to the billing or payment account associated with selected autonomous vehicle 100 based on the power data 269 received from charging control system 260 at selected charging station/lane 220 about the power transferred to selected autonomous vehicle 100.

While typical electric vehicle charging stations require human or automated mechanisms to charge the electric vehicle, no human intervention is necessary to charge autonomous vehicles 100 using the systems and methods described herein. As a further result, an entire fleet of autonomous vehicles can be operated in a network and recharged as necessary without requiring human intervention.

Although charging facilities 200 are typically provided at "off-road" locations, the systems described herein may also be implemented at posted street parking spots. This allows any street parking spot equipped as a charging station 220 to charge a vehicle while parked, thus providing "value added" revenue potential for a municipality. For example, "normal" down-time, such as when a vehicle is waiting for a passenger, can be maximized by charging while the vehicle is waiting. In this regard, charging stations can be provided at locations where a passenger may require the vehicle to wait while running an errand (e.g., a grocery store, mall, gym, school, or the like). A street parking spot equipped as a charging station 220 can also supply a municipality with vehicle ID 142 and "timed parked" information, eliminating the need for the municipality to purchase and maintain a separate parking revenue system. The use of charging station 220 equipment is also envisioned for use in "taxi lines" at airports, hotels, public attraction areas, etc., where multiple vehicles generally queue up in designated assignment areas awaiting fares. In these areas, power transmitting systems 240 may be installed, thus allowing charging to take place during unproductive revenue time situations. By charging the vehicle while it is waiting for a fare, the vehicle increases its futures potential utilization factor by reducing the future charging needs.

Because intelligent vehicle charging system 10 can benefit vehicles by even charging for a brief interval, the length of time (or lack thereof) that a vehicle is charged does not matter—every charging opportunity is a net "gain" to a service vehicle because every charging increases a vehicle's in-the-field operation time and because the efficiency of the power charging process is the same regardless of the charging duration. In addition, by constantly "topping off" the typically used Lithium battery packs, the service life of the battery packs is enhanced by minimizing the depth of the battery discharge cycle.

Because of the continuous data link from each individual charging station 220 to remote control system 300, the link can also be used for real-time "available/occupied status" of each charging station 220 throughout the network. This information can be provided to transportation network companies (TNCs) in the area, as well as individual autonomous vehicles and non-autonomous vehicles as needed.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. An autonomous vehicle charging facility comprising:
   a plurality of charging stations;

a power transmitting system located at each charging station, the power transmitting system being connected to a power supply; and a station charging control system operably connected to the power transmitting system at each charging station;

wherein each charging station is configured to wirelessly charge a vehicle;

wherein the station charging control system is configured to communicate with a remote control system to transmit station location data of the plurality of charging stations and to receive a vehicle ID for a selected autonomous vehicle assigned to a selected charging station for a power charging session;

wherein the station charging control system is configured to transmit alignment signals to the selected autonomous vehicle for aligning the autonomous vehicle with respect to the power transmitting system at the selected charging station;

wherein the remote control system assigns to each of the plurality of charging stations the autonomous vehicle before the autonomous vehicle arrives at the vehicle charging facility and before the autonomous vehicle is within a range of receiving the alignment signals from the plurality of charging stations at the vehicle charging facility; and wherein the power transmitting system is configured to transfer electric power to the autonomous vehicle transmitting the vehicle ID from the selected autonomous vehicle.

2. The autonomous vehicle charging facility according to claim 1, wherein the station charging control system includes one or more identification beacons located at each charging station; and wherein the one or more identification beacons at the selected charging station transmit the alignment signals for a specific charging station to the selected autonomous vehicle.

3. The autonomous vehicle charging facility according to claim 1, wherein the station charging control system includes one or more sensors located at each charging station; and wherein the one or more sensors detect the presence of the selected autonomous vehicle at the selected charging station.

4. The autonomous vehicle charging facility according to claim 3, wherein the station charging control system receives the vehicle ID from the selected autonomous vehicle at the selected charging station.

5. The autonomous vehicle charging facility according to claim 4, wherein the station charging control system is programmed with a unique charging station ID corresponding to each charging station; and wherein the station charging control system receives and forwards to the remote control system a specific vehicle ID and charging station ID to the remote control system for the selected autonomous vehicle present at the selected charging station.

6. The autonomous vehicle charging facility according to claim 4, wherein the station charging control system authenticates the vehicle ID from the autonomous vehicle at the charging station based on the vehicle ID for the selected autonomous vehicle assigned to the charging station, which is received from the remote control system.

7. The autonomous vehicle charging facility according to claim 4, wherein the power transmitting system automatically transfers electric power to the autonomous vehicle after the vehicle ID is authenticated as being associated with the autonomous vehicle assigned to the selected charging station by the remote control system.

8. The autonomous vehicle charging facility according to claim 1, wherein the station charging control system monitors the power transferred to the autonomous vehicle and transmits power data about the power transferred to the autonomous vehicle to the remote control system.

9. The autonomous vehicle charging facility according to claim 1, wherein the power transmitting system wirelessly transfers electric power to the autonomous vehicle.

10. The autonomous vehicle charging facility according to claim 9, wherein the power transmitting system includes a transmitter coil configured to be inductively coupled to a receiver coil in the autonomous vehicle to wirelessly transfer electric power.

11. The autonomous vehicle charging facility according to claim 1, wherein the station charging control system receives power charge status data for the autonomous vehicle from the vehicle charging control system during the power charging session.

12. The autonomous vehicle charging facility according to claim 11, wherein the station charging control system terminates the power charging session based on the power charge status data of the autonomous vehicle or a specific command from the remote control system.

13. The autonomous vehicle charging facility according to claim 11, wherein the station charging control system transmits the power charge status data for the autonomous vehicle to the remote control system.

14. Charging station equipment comprising:

a power transmitting system configured to be connected to a power supply; and a station charging control system configured to be operably connected to the power transmitting system;

wherein the station charging control system is configured to communicate with a remote control system to transmit station location data of a plurality of charging stations and to receive a vehicle ID for a selected autonomous vehicle assigned for a power charging session;

wherein each charging station is dynamically configured to wirelessly charge a specific vehicle;

wherein the station charging control system is configured to transmit alignment signals to the selected autonomous vehicle for aligning the autonomous vehicle with respect to the power transmitting system;

wherein the remote control system assigns to each of the plurality of charging stations the autonomous vehicle before the autonomous vehicle arrives at the vehicle charging facility and before the autonomous vehicle is within a range of receiving the alignment signals from the plurality of charging stations at the vehicle charging facility; and wherein the power transmitting system is configured to transfer electric power to the autonomous vehicle transmitting the vehicle ID from the selected autonomous vehicle.

15. The charging station equipment according to claim 14, wherein the station charging control system includes one or more identification beacons; and wherein the one or more beacons transmit the alignment signals to the selected autonomous vehicle.

16. The charging station equipment according to claim 14, wherein the station charging control system includes one or more sensors; and wherein the one or more sensors detect the presence of the selected autonomous vehicle.

17. The charging station equipment according to claim 16, wherein the station charging control system receives the vehicle ID from the selected autonomous vehicle.

18. The charging station equipment according to claim 17, wherein the station charging control system is programmed with a unique charging station ID; and wherein the station charging control system transmits the vehicle ID and charging station ID to the remote control system for the detected autonomous vehicle.

19. The charging station equipment according to claim 17, wherein the station charging control system authenticates the vehicle ID from the autonomous vehicle as being the autonomous vehicle assigned to the selected charging station by the remote control system based on the vehicle ID for the selected autonomous vehicle, which is received from the remote control system.

20. The charging station equipment according to claim 17, wherein the power transmitting system automatically transfers electric power to the autonomous vehicle after the vehicle ID is authenticated.

21. The charging station equipment according to claim 14, wherein the station charging control system monitors the power transferred to the autonomous vehicle and transmits power data about the power transferred to the autonomous vehicle to the remote control system.

22. The charging station equipment according to claim 14, wherein the power transmitting system wirelessly transfers electric power to the autonomous vehicle.

23. The charging station equipment according to claim 22, wherein the power transmitting system includes a transmitter coil configured to be inductively coupled to a receiver coil in the autonomous vehicle to wirelessly transfer electric power.

24. The charging station equipment according to claim 22, wherein the station charging control system receives power charge status data for the autonomous vehicle from the vehicle charging control system during the power charging session.

25. The charging station equipment according to claim 24, wherein the station charging control system terminates the power charging session based on the power charge status data of the autonomous vehicle or a specific command from the remote control system.

26. The charging station equipment according to claim 24, wherein the station charging control system transmits the power charge status data for the autonomous vehicle to the remote control system.

27. A method of electrically charging an autonomous vehicle at a charging station comprising the steps of:
- a station charging control system communicating with a remote control system to transmit station location data of a plurality of charging stations and to receive a vehicle ID for a selected autonomous vehicle assigned for a power charging session;
- the station charging control system transmitting alignment signals to the selected autonomous vehicle for aligning the autonomous vehicle with respect to a power transmitting system; and
- the power transmitting system transferring electric power to the autonomous vehicle transmitting the vehicle ID from the selected autonomous vehicle;
- wherein the remote control system assigns to each of the plurality of charging stations the autonomous vehicle before the autonomous vehicle arrives at the vehicle charging facility and before the autonomous vehicle is within a range of receiving the alignment signals from the plurality of charging stations at the vehicle charging facility; and
- wherein each charging station is configured to wirelessly charge a vehicle.

28. The method according to claim 27, wherein the station charging control system includes one or more identification beacons corresponding to a specific charging station; and
- wherein the one or more beacons transmit the alignment signals to the selected autonomous vehicle.

29. The method according to claim 28, wherein the station charging control system includes one or more sensors; and
- wherein the one or more sensors detect the presence of the selected autonomous vehicle.

30. The method according to claim 29, further comprising the step of: the station charging control system receiving the vehicle ID from the selected autonomous vehicle.

31. The method according to claim 30, wherein the station charging control system is programmed with a unique charging station ID; and
- further comprising the step of: the station charging control system transmitting the vehicle ID and charging station ID to the remote control system for the detected autonomous vehicle.

32. The method according to claim 30, further comprising the step of: the station charging control system authenticating the vehicle ID from the autonomous vehicle as being associated with the autonomous vehicle assigned to the selected charging station by the remote control system based on the vehicle ID for the selected autonomous vehicle, which is received from the remote control system.

33. The method according to claim 30, wherein the power transmitting system automatically transfers electric power to the autonomous vehicle after the vehicle ID is authenticated.

34. The method according to claim 27, further comprising the steps of:
- the station charging control system monitoring the power transferred to the autonomous vehicle; and
- the station charging control system transmitting power data about the power transferred to the autonomous vehicle to the remote control system.

35. The method according to claim 27, wherein the power transmitting system wirelessly transfers electric power to the autonomous vehicle.

36. The method according to claim 35, wherein the power transmitting system includes a transmitter coil configured to be inductively coupled to a receiver coil in the autonomous vehicle to wirelessly transfer electric power.

37. The method according to claim 27, further comprising the step of:
- the station charging control system receiving power charge status data about for the autonomous vehicle from the vehicle charging control system during the power charging session.

38. The method according to claim 37, further comprising the step of:
- the station charging control system terminating the power charging session based on the power charge status data of the autonomous vehicle or a specific command from the remote control system.

39. The method according to claim 37, further comprising the step of:
- the station charging control system transmitting power charge status data for the autonomous vehicle to the remote control system.

40. The autonomous vehicle charging facility according to claim 1, wherein the station location data comprises satellite navigation system coordinates.

41. The charging station equipment according to claim 14, wherein the station charging control system is configured to be operably connected to an additional power transmitting system, and wherein the power transmitting system and the additional power transmitting system are each configured to charge a vehicle.

42. The charging station equipment according to claim 14, wherein the station location data comprises satellite navigation system coordinates.

43. The method according to claim 27, further comprising the steps of:
- the station charging control system communicating with the remote control system to receive a vehicle ID for a second selected autonomous vehicle assigned for a power charging session;
- the station charging control system transmitting alignment signals to the second selected autonomous vehicle for aligning the autonomous vehicle with respect to a second power transmitting system of another charging station of the plurality of charging stations; and
- the second power transmitting system transferring electric power to the second selected autonomous vehicle.

44. The method according to claim 27, wherein the station location data comprises satellite navigation system coordinates.

* * * * *